Patented Oct. 14, 1952

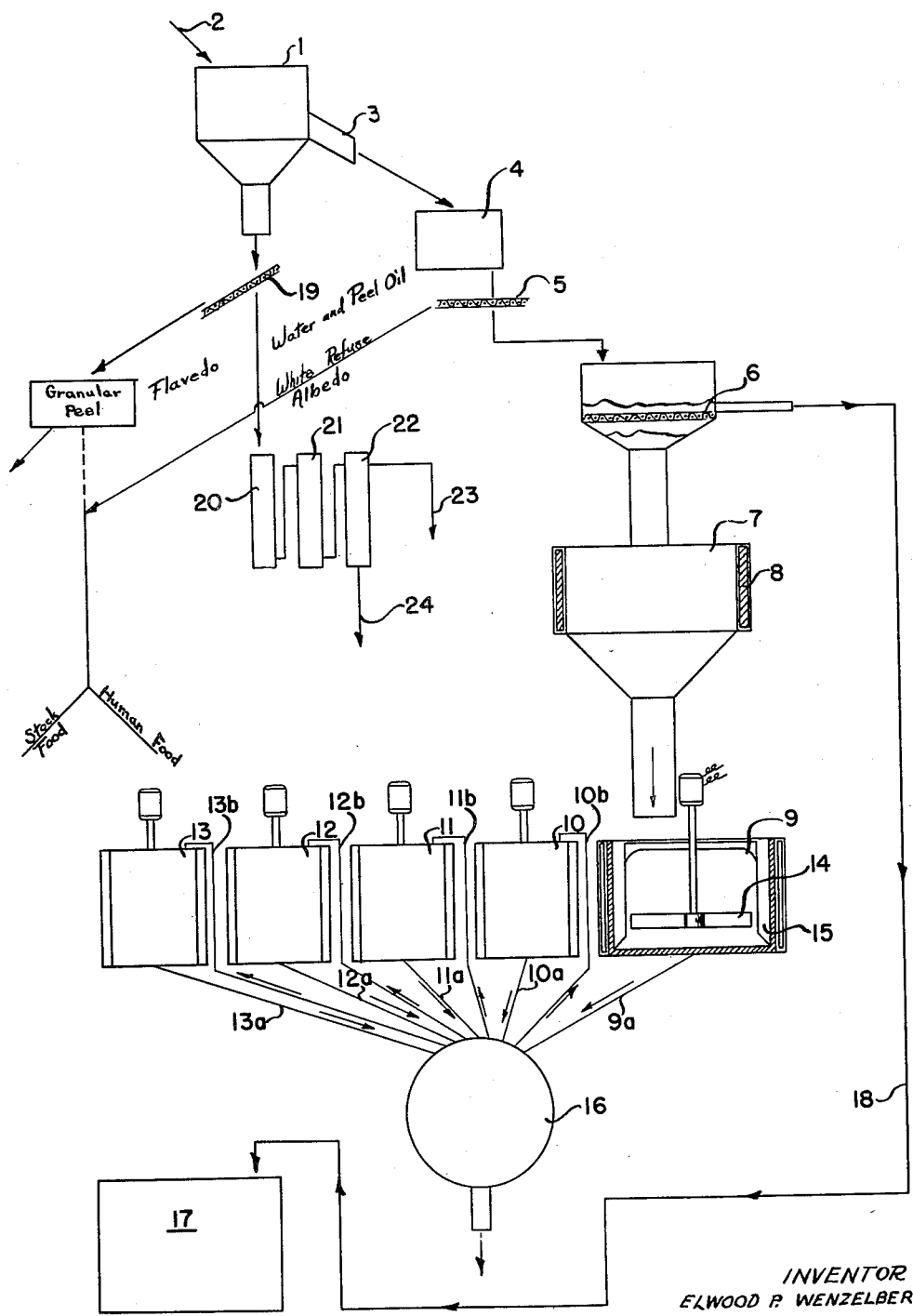

2,614,048

UNITED STATES PATENT OFFICE 2,614,048

METHOD OF EXTRACTION AND TREATMENT OF FRUIT PRODUCTS

Elwood Paul Wenzelberger, Dayton, Ohio, assignor to Commonwealth Engineering Company of Ohio, Dayton, Ohio, a corporation of Ohio Application May 29, 1950, Serial No. 165,048

10 Claims. (Cl. 99—155)

My invention relates to the production of citrus juice and similar materials that are heat sensitive.

It is an object of this invention to provide a process for producing a fruit juice product that is substantially free of bacteria and free of peel oil.

It is a further object of this invention to provide means of removing the peel of the citrus fruits by a progressive abrading action during which the refuse so abraded from the surface of the citrus fruit is carried away with a stream of water so that the bacteria carried on the citrus fruit peel will be removed before the underlying white coating is ruptured during the subsequent operation.

It is a further object of this invention by thus removing the peel in small particles by such abrading action to remove the source of peel oil so that during the press operation no peel oil will find its way into the fruit juice.

It is a still further object of this invention to provide in this combination as a part of this process the following features: means of segregating the water and peel oil from the grated peel and means of conveying the peel in one direction for use in stock foods and the like while the peel oil and water is conveyed to stills for the production of peel oil; a means for pressing the peeled fruit so that the juice free of peel oil and bacteria can be delivered into a freeze dehydration system by which the water is progressively converted into crystal ice crystals which can be removed as the concentration progresses until the desired concentration results from the removal of the desired amount of water. This is accomplished without heat or vacuum so that none of the components of the juices are disturbed in their relationship to one another and none are removed.

It is an object of this invention to provide a complete process in which the contaminating factor of peel oil and bacteria are eliminated by abrading and washing of the exterior peel while the fruit is conveyed in clean unpunctured white coating.

It is an object of this invention to remove by an abrading action accomplished by rapid rotation on the various axes of the fruit the epicarp or flavedo leaving only the white cover material known as the albedo to hold the fruit together. This leaves the inside sections of the fruit in the side wall juice sacks known as carpels.

In the prior art the practice has been to cut the fruit in half and press the juice from the fruit with the peel intact. In the first place, this peel is impregnated with a high bacteriological count which contaminates the resulting juice. The instant process avoids this. Even though the peel under the old process had been washed and scraped it has been found impossible to eliminate this bacterial contamination. Under the present process of this invention it has been found that the count is very low, not only for this reason, but for the fact that no heat is employed in the dehydration which has the effect of actually cultivating and increasing whatever bacteria is entrained in the juice from the peel. As the juice is very largely sugar, the solids being primarily sugar, under the old process of using heat and vacuum for dehydrating juice the very environment increases the bacteria and results in spoilage unless the greatest care is exercised in refrigeration after the product is ready for market.

To the contrary, by the instant process which only uses dehydration by freezing, the joint steps of eliminating any bacteria by eliminating the peel before pressing and the use of refrigeration only instead of heat results in a product that has been produced and kept over considerable periods of time without any refrigeration.

The second cause of contamination of the juice under the old process of pressing the juice with the peel on by the halves of fruit is that the peel oil is squeezed into the juice which ruins its taste unless removed. Therefore, the practice in the old art has been to apply heat and high vacuum in order to remove the peel oil from the juice as it was concentrated. But this proved to be a double evil in that it necessitated heat in order to distill the peel oil from the juice. To cut down the effects of the heat the expensive high vacuum is employed. The results of the heat and high vacuum not only removed the peel oil, but also removed the deliciate esters in the juice and changed the taste of the juice.

In order to overcome the evil taste in the juice produced by the heat and vacuum process of the old art, it has been the practice in the industry, upon the completion of the dehydration to add 25% of the raw juice to the dehydrated juice to mask the evil taste. But this introduced not only the peel oil in the 25% but the bacteria also, so that it was necessary to preserve the freshness of the juice by placing it in expensive refrigerators at all stages of distribution. The instant process eliminates the high cost of heat, high vacuum and of the 25% of raw juice.

Another advantage over the old art is that in the present process the peel oil is scraped away with the water during the abrading operation and can be distilled so as to kill the bacteria and to provide a concentrated peel oil, which at the present market sells for $75 a pound.

The third advantage over the old art is that the refuse consisting of the grated peel is in such condition that the peelings containing the peel oil are ruptured and broken open and the yield of peel oil is much greater.

Likewise, this grated peel eliminates expensive steps in the process of human and stock foods during which steps the two products in the old art of stock food and citrus molasses acquired a taste and discoloration which were greatly disadvantageous and necessitated long expensive heat processing because of the necessity for taking the halves of fruit, disintegrating them by powerful current consuming machines, such as impact mills, subjecting the refuse to chemical and ageing treatment at high temperatures and then drying the material during long periods in high temperature rotating retorts, all of which are expensive and destructive of the very elements in the peel which are most valuable for the feeding of stock or for human consumption. Instead, it has made it practically impossible to use such refuse peel for human consumption.

Additionally, the disadvantage of the old process has been the fact that the valuable by-product of citrus molasses was already started on its course by the heat treatments which discolored it and caused it to be sold at a very low price for mere sweetening or fortification of stock food. Whereas, by the present process there being relatively little or no heat applied to the stock food process and the peel oil having been removed from the stock food and citrus molasses, both the discoloration and the bad taste has been eliminated.

The skin or peel of citrus fruit surrounds the encased fruit and may vary between ⅛ to ½ inch in thickness for any number of natural or horticultural reasons. The outermost layer of this skin or peel is called the flavedo. It contains the coloring matter giving the fruit its characteristic color, it contains cells high in oil content which are the source of "peel oil," and it contains other ingredients of a bitter nature not too desirable in producing useful products from flavedo. The flavedo is usually about 10% as thick as the entire structure commonly called skin or peel.

The remaining 90%, or so, of the skin or peel is called albedo. This is the thick pithy pulp surrounding the citrus fruit and also covering each fruit section. The albedo is rich in food value and chemical products such as pectin. It is a cellulose product and can be used in industry where such materials have utility. This product is a good stock or cattle food as such. At the present time the practice of industry does not permit production of albedo as such. This process will do just this and is of importance in this one advance alone.

By the method of operation of this invention, we abrade away the flavedo under a stream of water. In this operation there is removed all the flavedo plus a small amount of albedo to be sure we get all undesirable products away.

From this "de-oiling" operation comes a thin slurry of waterwash, grated rind (or flavedo), and an amount of peel oil. The major portion of peel oil is still held within the granular abraded particles of flavedo. This total product (gratings and all) must be taken and steam-distilled in order to obtain a crude fraction of oil. This oil has a ready market as is or may be further refractionated to provide purer and more desirable products.

The reason for using the present complicated methods of processing pulp in the citrus industry today to produce a dried cattle or stock food is because pulp as now produced contains the bitter peel oils and flavedo, as well as the desired albedo. Without the flavedo and peel oils, the albedo becomes a palatable food suitable for human or animal consumption.

The orange seeds can be recovered and processed as they are a source of oils having value in the coatings and sulfonated oil industry.

Referring to the drawings:

Figure 1 is a diagrammatical view showing the complete flow sheet of the process of my invention.

According to the drawings, 1 designates a peeler. A typical machine for this purpose is illustrated and described in application, Serial No. 172,161, filed July 5, 1950. It consists of a series of abrading sections engaging the rapidly rotating surfaces of oranges and the like. This abrading action takes place in the presence of a stream of water indicated at 2. The fruit makes its exit with the peel and removed down to and including the white layer flavedo. This leaves only the albedo holding the fruit together. This exit is at 3 whence the fruit passes to the juice press 4. The screen 5 removes any entrained flavedo and carpels permitting the juice and the pulp to pass to the screen 6 which removes the pulp that is ultimately delivered to a holding tank hereinafter described for addition to the dehydrated juice. The juice enters the holding tank 7. From this point on the process is that as described in my co-pending application, Serial No. 170,285, filed June 26, 1950, which I will repeat briefly here. The holding tank is reduced by a cooling jacket 8 to a temperature for the juice of approximately 32°. The juice from this holding tank is admitted to a succession of tanks 9, 10, 11, 12 and 13. In each tank the temperature is progressively lower than in the preceding tank. For instance a temperature range in tank 9 will be approximately 25° F., the temperature range in tank 10 will be approximately 18° F., the temperature range in tank 11 will be approximately 11° F., the temperature range in tank 12 will be approximately 4° F., and the temperature range in tank 13 will be approximately −3° F. The differential between the temperature of the cooling medium in the jacket around each tank and in the tank itself is approximately 7°. It is preferred to have the same differential in temperature between tanks. This differential between tanks is approximately 7°. The tanks are progressively lower in temperature by this amount. Ice crystals are formed as crystal ice in each successive tank in order to remove the water from the juice. In commercial practice it has been found that the entraining of any solids in the ice is as low as .02 of 1%. This, of course, varies with the material but it is indicative of the process. After the ice has been formed in tank 9 in which the content is stirred and the ice is scraped to prevent it adhering to the metal parts as indicated by stirrer 14 and scraping mechanism 15 diagrammatically illustrated, the combined ice and juice is passed to the centrifuge 16 where the ice is separated and passed to another point where it is utilized in assisting in the refrigeration. The ice free juice or the substantially ice free juice is returned to tank 10 where the process is repeated with a similar apparatus and a lower temperature. It has been found preferable in some instances for a certain amount of the ice to be returned to the centrifuge of the next tank in order to act as a seeding mechanism. The pipes 9a, 10a, 11a, 12a and 13a are exit pipes from the tanks to the centrifuge 16, while pipes 10b, 11b, 12b and 13b are return pipes of concentrate to each tank from the centrifuge 16. This same process is repeated in successive tanks, the number of which depend upon the capacity of the system and the extent of dehydration. When the final tank 13 discharges its contents to the storage tank 17, the pulp which is discharged from the screen 6 is added to the juice through a pipe 18 so that the user will ultimately have pulp floating in the juice in the same manner he is accustomed to when squeezing an orange by hand.

*Peel oil*

Having produced so far the concentrated citrus juice, we now turn to the point where the water and grated peel is discharged from the peeler 1. This material is discharged upon the screen 19. The granular grated peel is then delivered to a process for the making of either stock food or foods for human consumption. The water carrying the peel oil and other oils found in the peel which have been released due to the disintegration of the peel is then passed into a series of stills 20, 21 and 22 where the peel oil is extracted through the pipe 23 while the waste water leaves at 24. In this manner the concentrated peel oil is secured as a valuable by-product.

It will thus be seen that according to the complete process the fruit is completely utilized: the granular peel is used for stock and human food, the peel oil is concentrated and the juice is dehydrated.

It will be understood that my hereinafter appended claims are intended to be constituted as broad enough to cover the necessary mechanical process variation in adapting this process to various conditions of use and that accordingly they are applicable to any product to be dehydated, particularly a product that is heat sensitive.

Having thus fully described my invention, what I claim as new and desire to secure by Letters Patent is:

1. In a method of processing citrus fruit, the step (a), of removing the flavedo portion of the rind of the fruit, the step (b), of carrying away the rind refuse from the surface of the fruit as rapidly as formed by a stream of water, the step (c), of extracting the juice from the fruit by applying pressure to the fruit substantially free of rind, and the step (d), of extracting water from said extracted juice by dehydration by freezing.

2. In a method of processing citrus fruit, the step (a), of abrading and disintegrating the peel at the surface of the fruit, the step (b), of simultaneously washing the so formed refuse from the surface of the fruit by a stream of water as peeled, the step (c), of separating the washing water containing entrained peel oil from the peel refuse, and the step (d), of distilling the peel oil from said washing water.

3. In a method of processing citrus fruit, the step (a), of abrading and disintegrating the outer peel portion at the surface of the fruit, the step (b), of simultaneously washing the so formed refuse from the surface of the fruit as peeled by a stream of water, the step (c) of separating the so peeled fruit from washing water containing entrained peel oil from the fruit peel, the step (d), of distilling the peel oil from said washing water, the step (e), of delivering the so peeled fruit to a press while retained within the inner peel portion of the fruit, the step (f), of pressing the juice from said peeled fruit, and the step (g), of dehydrating the juice by freezing the same in selected steps of temperature reduction.

4. In a method of processing citrus fruit, the step (a), of peeling and disintegrating the flavedo peel portion at the surface of the fruit, the step (b), of simultaneously washing the so formed refuse from the surface of the fruit as peeled by a stream of water, the step (c), of separating the so peeled fruit from the washing water containing entrained peel oil from the fruit peel, the step (d), of distilling the peel oil from said washing water, the step (e), of delivering the so peeled fruit to a press while retained within the inner peel portion of the fruit, the step (f), of pressing the juice from said peeled fruit, the step (g), of dehydrating and concentrating the juice by freezing, and the step (h), of removing pulp from the juice prior to freezing and thereafter returning the pulp to said juice after the concentration.

5. In a process of treating citrus fruit, the step (a), of abrading the flavedo peel portion of a fruit into a grated peel and simultaneously carrying away the grated peel by a stream of water, the step (b), conveying the peeled fruit thus washed and wherein the fruit is held together by the inner peel portion of the fruit and pressing the fruit to expel the juice therefrom while so contained, and the step (c), of screening from the resulting juice the refuse and pulp.

6. In a process of treating citrus fruits, the step (a), of abrading the flavedo peel portion of a fruit into a grated peel and simultaneously carrying away the grated peel by a stream of water, the step (b), conveying the fruit thus washed with the fruit held together by the inner albedo peel portion of the fruit and pressing the fruit while so contained, the step (c), of screening from the resulting juice refuse and pulp, and the step (d), of dehydrating the juice by freezing.

7. In a process of treating citrus fruits, the step (a), of abrading the flavedo peel portion of a fruit into a grated peel and simultaneously carrying away the grated peel by a stream of water, the step (b), conveying the fruit thus washed with the fruit held together by the inner albedo peel portion of the fruit and pressing the fruit while so contained, the step (c), of screening from the resulting juice refuse and pulp, and the step (d), of dehydrating the juice by step freezing, said freezing comprising the sub-steps of (1), pre-cooling the juice, (2) reducing the juice below the freezing point of water to form ice crystals therein; (3) separating the ice crystals from the remaining juice, and (4) repeating each step of dehydration likewise until the desired concentration is accomplished.

8. In a method of processing citrus fruit to obtain bacteria-free juice, the step (a) of removing the flavedo peel portion from the fruit while retaining unbroken the albedo peel portion to retain the fruit and the juice in their original bacteria-free condition within the albedo skin, the step (b) of continuously washing the fruit simultaneously with the removal of the outer peel, the step (c), compressing the said peeled fruit while maintained in its bacteria free condition to press the juice from within the fruit, and the step (d) of removing water from the recovered juice by freezing said juice while maintaining it in its bacteria free condition.

9. In a process of extracting and separating materials in citrus fruits, the step (a), of removing the flavedo peel portion from the citrus fruits by abrading and disintegrating and washing the same with water to remove the source of peel oil and the source of bacteria from the fruit while retaining unbroken the inner peel portion on the fruit, the step (b), of delivering disintegrated peel with the wash water by screening the same for the production of food from the peel and peel oil from the peel, the step (c) of delivering the so washed, peeled fruit comprising the albedo peel portion to a press, the step (d), of pressing the juice from said peeled fruit that is substantially free of bacteria and peel oil, and the step (e), of concentrating said juice by dehydrating the same by freezing said juice.

10. In the process of treating citrus fruit to extract the fruit juice and peel oil therefrom in a substantially bacteria free condition and wherein the fruit is peeled and the peeled fruit pressed to extract the juice, the improvement step of mechanically removing the flavedo peel portion from the fruit and leaving the fruit containing the juice and albedo peel portion, and thereafter subjecting the said peeled fruit to pressure to remove the juice from the pulp and concentrating said juice by subjecting the same to dehydration by freezing.

ELWOOD PAUL WENZELBERGER.

REFERENCES CITED

The following references are of record in the file of this patent:

UNITED STATES PATENTS

| Number | Name | Date |
|---|---|---|
| 2,059,828 | Verley | Nov. 3, 1936 |
| 2,079,542 | Bauer | May 4, 1937 |
| 2,354,633 | Bedford | July 25, 1944 |
| 2,424,663 | Mantle | July 29, 1947 |
| 2,440,676 | Dunkley | May 4, 1948 |